United States Patent [19]
Osborne et al.

[11] 3,781,706
[45] Dec. 25, 1973

[54] INCREMENTAL PHASE SHIFT FREQUENCY SYNTHESIZER

[75] Inventors: Eugene F. Osborne, Westminster; Terrence L. McGovern, Laurel, both of Md.

[73] Assignee: The United States of America as represented by the Secretary of the Navy, Washington, D.C.

[22] Filed: Aug. 4, 1972

[21] Appl. No.: 277,968

[52] U.S. Cl. .......................... 331/45, 321/54, 325/63, 328/155, 332/16
[51] Int. Cl. .......................... H03b 27/00
[58] Field of Search .......................... 331/74, 1, 45; 328/155, 66, 67; 332/16; 321/54; 325/63

[56] References Cited

UNITED STATES PATENTS

| | | | |
|---|---|---|---|
| 2,791,694 | 5/1957 | Groenendyke | 331/45 |
| 3,421,088 | 1/1969 | Salley et al. | 332/16 |
| 3,517,323 | 6/1970 | Rudin, Jr. | 328/155 |
| 3,530,365 | 9/1970 | Peugh | 331/45 |

*Primary Examiner*—John Kominski
*Attorney*—R. S. Sciascia et al.

[57] ABSTRACT

Apparatus for synthesizing an adjusted reference signal at a frequency that is controllable to a prescribed value performs the programmed addition (or subtraction) of sequential incrementation of phase shift to the reference signal output of an undisturbed oscillator that has a characteristic frequency of oscillation that is accurately predictable for a significant time period into the future. Purposes of the proposed apparatus include (a) the generation and maintaining of small offsets in the frequency of the adjusted output reference signal relative to the nominal or actual frequency of the oscillator, (b) the compensation for the time dependent predictable drift of the source oscillator to maintain the adjusted output signal at the desired frequency even though the source oscillator frequency changes, (c) the operation of precise time and frequency systems with complete coherency between the modulation representing timing and the RF carrier representing frequency, and (d) the ability to calibrate, adjust, and normalize the timing of a clock system operating from the adjusted reference signal both as to location of its epoch(s) and its scale relative to an accepted system primary standard of time.

8 Claims, 9 Drawing Figures

INCREMENTAL PHASE SHIFT FREQUENCY SYNTHESIZER

CROSS-REFERENCES TO OTHER APPLICATIONS

The present application in part discloses and claims subject matter disclosed in an earlier filed and commonly assigned pending application by the same inventors, such application having Ser. No. 94,142, now abandoned, and having been filed Dec. 1, 1970.

BACKGROUND OF THE INVENTION

The present invention relates to apparatus that provides for the synthesis of a precise reference frequency through the repetitive application of incremental phase adjustments to the actual source (e.g., oscillator) frequency, said present invention having reference and specific application in satellite and ground receiver service in the fields of navigation, world-wide timing, communications, and general application in any system which requires precise frequency, time, and/or time intervals.

Secondary frequency standards are subject to drift in the output signal due to long term aging and to systematic and random variations of the controlling environmental factors, For many applications it is desired to stabilize and control the frequency of the reference signal to a unique specified value within a small allowable tolerance, removing, in effect, all of the predictable variations of the source oscillator that may occur in a finite future sampling or observation interval.

Several approaches to the compensation of oscillator drift have been and are being developed. One general approach operates directly to vary a parameter of the basic oscillator circuits thereby adjusting its frequency of oscillation. Another approach preserves the reference oscillator parameters but adjusts the system output frequency by interposing a selectable or variable synthesizer between the reference source and the system output terminals. In one precise timing application, a concept of fixed oscillator parameters together with a synthesizer comprised of a variable and selectable speed electromechanically driven resolver for continuous phase compensation was employed. In still another timing application a differentially driven quadrant potentiometer was used for continuous phase compensation to calibrate clock epochs where the source was a rubidium standard.

SUMMARY OF THE INVENTION

The subject invention is a digitally controlled all electronic compensator of the synthesizer type. The present compensator uses a controlled incremental phase shifter and a frequency selective transmission filter to synthesize an output frequency at a specified value although the source or input frequency may be offset in value and be subject to variable drift rates. The incremental phase controller has a total phase range of 360° divided into an integral number of steps which may be selected in sequential order to either advance or retard the rotating carrier vector. Due to the inherent phase ambiguity of periodic waves the progressive and repetitive addition of phase over the limited range of 0° to 360° will produce a shift in frequency of the output signal of the synthesizer with no change in the input from the source oscillator. Phase shifting in quantized steps rather than in a smooth continuous function results in a small residual phase modulation which may be removed from the output signal by standard frequency selective (i.e., band-pass) amplitude filtering techniques.

It shall be noted that a tapped delay line is equivalent to an incremental phase shifter when the total delay is equal to the period of one cycle of the nominal operating frequency and the total delay is subdivided into an integral number of equal smaller delays which may be selected in sequential order, by access to the tops of the delay line, to either advance or retard the rotating carrier vector.

An object of the present invention is to provide apparatus that will permit compensation for basic error in the initial setting of the oscillator frequency and for its subsequent time dependent drift in frequency and thereby generate an adjusted output signal which can be controlled to provide better long term stability and less error.

Another object is to provide apparatus that can be used to advance or retard the position of the epochs of timing signals which are locally generated from the compensated or adjusted output signal for transmission by radio or other means to remote receiving sites where the received signals may then be used for calibrating and adjusting time references or frequency standards at the remote sites.

Yet another object is to provide apparatus that will permit generation of small offsets in the frequency of the adjusted reference output signal relative to the nominal input signal.

Another object is to provide apparatus that will utilize incremental phase shifts for frequency normalization.

Still another object is the provision of a precise but adjustable incrementally phase compensated reference signal, sufficient for the totally coherent generation and transmission of timing modulation and RF carrier frequency references.

A further object of the invention is the provision of an incrementally phase compensated synthesizer that is completely solid state.

A further object of the invention is the provision of time and frequency normalizing apparatus that is programmable for an interval of future time from the memory register of a digital system.

Other objects, purposes and characteristic features of the present invention will in part be pointed out as the description of the invention progresses and in part be obvious from the accompanying drawings, wherein.

DESCRIPTION OF THE PREFERRED EMBODIMENTS

Figure 1:
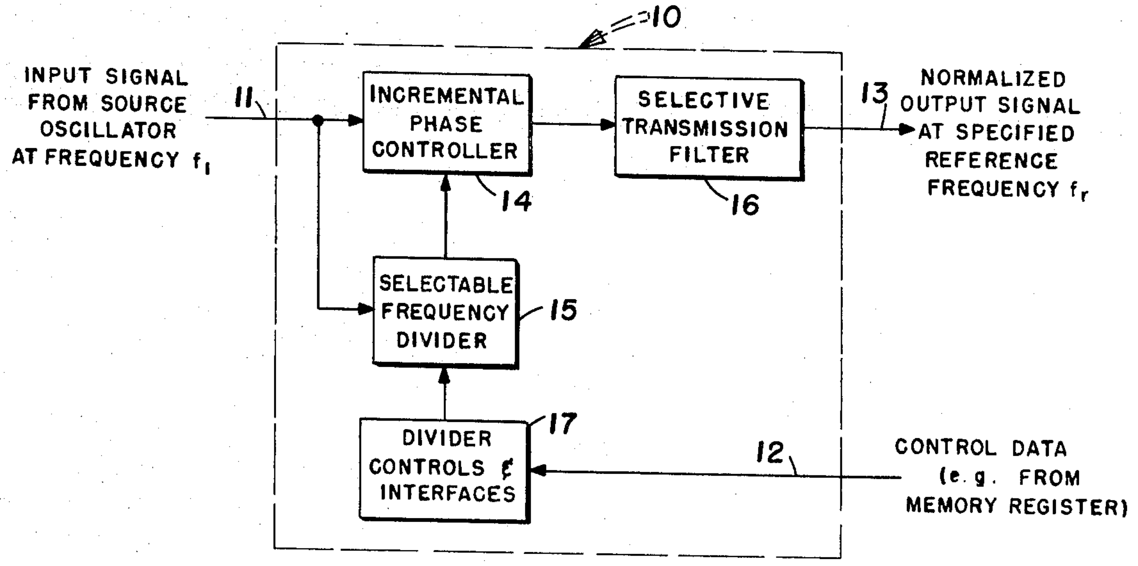
FIG. 1 is a block diagram of the subject invention.

The general theory of incremental phase compensation begins with a definition of the frequency, which is, $f(t) = d/dt\ \phi\ (t)$ 1.

and the accumulative phase of the electric wave, which is $$\phi(t) = 2\Pi \int^{T} f(t)dt \text{ (in radians).} \quad (2)$$

Assume for a crystal oscillator that its frequency of oscillation during a time interval can be expressed by a time series;

$f_1\ (t) = f_r \pm f_o \pm at \pm bt^2 + \ldots$ 3.

where $f_r$ = specified frequency at the output terminal $f_o$ = offset or bias frequency at each calibration epoch which permits practical finite settability resolution and crystal procurement.

$a$ = drift or aging rate of crystal effecting frequency of oscillation.

$b$ = rate of change of drift or acceleration of the frequency of oscillation.

Now in any time period between calibrations it will be assumed that the coefficients of the series are constant and will converge rapidly so that the higher order components of the time series are negligible, and that the polarities of each coefficient are typical of crystal standards when operating in normal terrestrial environments so that $f_1\ (t) \approx f_r - f_o + at$ 4.

The output of the oscillator is a vector quantity $v(t) = V e^{j\phi}\ {}^{\prime}t)$ 5.

where the accumulative phase in the interval from O to T is $\phi_1\ (t) = [\ 2\pi\ (f_r - f_o + at/2)\ t\ ]_0^T$ 6.

The accumulated phase-time function of equation (6) can be compared to the numerically specified output of the system, which is $\phi_r\ (t) = [\ 2\pi\ f_r\ t\ ]_0^T$ 7.

to determine the amount of phase compensation required as a function of time, which is $\phi_c\ (t) = -2\pi\ [\ (-f_o + at/2)t\ ]_0^T$ radians 8.

or $\phi_c\ (t) = -360\ [\ (-f_o + at/2)\ t\ ]_0^T$ degrees. 9.

But at any time, $t$, the required phase compensation may also be expressed as $\phi_c(t) = -360\ n(t) - \theta\ (t)$ 10.

where n(t) is limited to integral values 0, 1, 2, 3, . . . N, and $\theta$(t) is limited to values less than $2\pi$radians. If the time, $t_o$, represents a system calibration and reset epoch then $n(t)$ is merely the accumulative number of times that the phase controller has been commutated and $\theta(t)$ is the current phase position within the bounds of 0° to 360°.

In a phase adjusted frequency shifter the signal output from the controller is $v(t) = A \cos\ [\ 2\pi\ (f_r - f_o + at)\ t + \phi_c\ (t)\ ]$ 11.

If a logic controlled incremental phase shifter is used the output can be expressed as $v(t) = A \cos\ [\ 2\pi\ (f_r - f_o + at)\ t + \Delta\ \theta t{\cdot}g\ (t)\ ]$ 12.

where $\Delta\theta$ = magnitude of phase increment equal to $2\pi$/M radians,

M = desired number of discrete phase steps in $2\pi$ radians, and $g(t)$ = a variable switching function as predicted for each interval between system calibration epochs based on oscillator offset and extrapolated drift rate.

Assuming an ideal prediction for incremental phase adjustment:

$$\Delta\theta t{\cdot}g(t) = 2\Pi(f_o - at)t + \frac{\delta\theta}{2}(t) \sum_{n=-\infty}^{\infty} C_n e^{j n\omega(t) t} \quad (13)$$

so that the phase controller output becomes:

$$v(t) = A \cos\left[2\Pi f_r t + \frac{\delta\theta(t)}{2} \sum_{n=-\infty}^{\infty} C e^{j n\omega(t) t}\right] \quad (14)$$

This describes a signal at precisely the desired carrier frequency but one having residual low level symmetrical sidebands due to the quantification employed in the phase adjustment. The deviation ($\delta\theta$) and the modulating frequencies ($n\omega$) in equation (14) can be considered constant for periods much longer than the interval of a single commutation of the phase controller so that the residual phase modulation spectrum is amenable to estimation by standard Fourier techniques.

Referring now to FIG. 1 there is shown a basic block diagram which identifies the specific apparatus of the subject invention. More specifically, the proposed incremental phase shift synthesizer is enclosed within the dashed block 10 and accepts, at 11, an input signal of frequency $f_1$ from a source oscillator, for example, (not shown) together with a program of digital control instructions which are obtained, at 12, from the timed readout of an associated memory register, for example (also not shown) and operates to provide a normalized or adjusted output signal, at 13, which is at a specified reference frequency, $f_r$, within an acceptable tolerance of error. It should be clearly understood that neither the source oscillator nor the memory register form a part of the present invention but merely constitute typical sources, respectively, of the signal to be synthesized and the phase incrementing control instructions.

Generally the frequency $f_1$ of the input signal at 11 is substantially offset from the frequency $f_r$ of the normalized output signal at 13. For example, in a navigation satellite system employing the subject invention, the source oscillator frequency $f_1$ is at about 140 parts per million below 5 mHz with predictable drift rates of a few parts in $10^{10}$ per day; whereas, the adjusted or normalized output signal $f_r$ is programmed by the subject invention to 84.48 parts per million below 5 mHz with a tuning resolution in frequency of 6 to 8 parts in $10^{13}$ and a capability for setting time marker epochs with resolution less than 1 nanosecond. More generally, it will be desirable to operate the input signal source, if it is a crystal oscillator, at cardinal values; i.e., with zero offset, and to generate the required system offset by the synthesizer, as described hereinafter in more detail.

The apparatus of the subject invention illustrated in FIG. 1 includes as, major subcircuits: an incremental phase controller 14 for the sequential addition or subtraction of increments of phase shift to the applied oscillator input signal at 11; a selective frequency divider 15 which is adjusted by command to divide down from the frequency either of the source oscillator signal at 11, as shown in FIG. 1, or the normalized output frequency ($f_r$) as an alternative, to develop a lower frequency of appropriate value for the sequential actuation of the phase controller 14 to effectively introduce the desired incrementation of phase to the input source signal; a selective transmission filter 16 whose purpose is to pass the adjusted or normalized output signal at the specified frequency, $f_r$, and to attenuate the residual energy that feeds through from the source oscillator at $f_1$ and any residual modulation introduced by the apparatus as a consequence of the phase incrementation; and, finally the divider controls and interfaces 17 that accept control information that is programmed to change with elapsed time as required to describe the performance which has been predicted for the next control period and that operates to set the modulus of the dividing ratio (divisor) of the selective frequency divider 15. Further details of these major subcircuits are included as the description proceeds.

Figure 2:
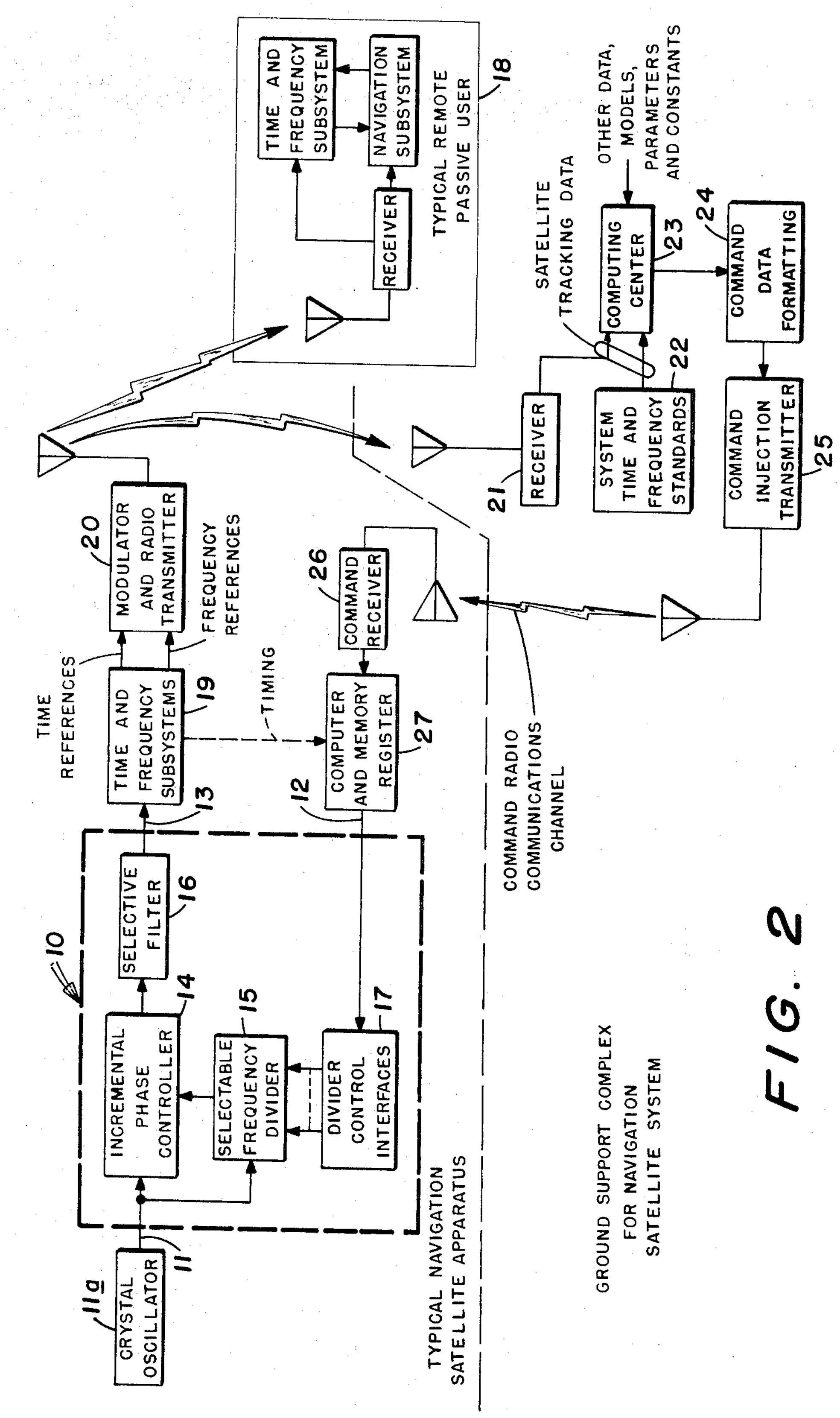
FIG. 2 is a generalized block diagram illustrating a typical application of the present invention in a navigation satellite system.

As an aid to the general understanding of the subject invention, consider its application in a typical system that depends upon precise time and frequency. For example, the Navy Navigation Satellite System, popularly referred to as the TRANSIT Navigation System is illustrated in FIG. 2 and the subject invention has been developed into flight qualified hardware, for application therein. The over-all navigation system includes low altitude, earth satellite(s) in polar orbit that transmit precise time and frequency ordered radio signals, a complex of ground-based support station(s) that operate at periodic intervals (typically each 12 hours) to calibrate and predict the performance of a satellite-borne precision oscillator for the next (12–16 hour) interval and to send digital instructions to the satellite, injecting the instructions via the command radio channel for storage in the memory register of a satellite-borne computer, the readout of which provides delayed command and control of the proposed incremental phase shift synthesizer of the present invention to affect the desired compensation for drift, to set epoch, or to change the offset. The Navy Navigation Satellite System including satellites and supporting ground stations exists to benefit a multiplicity of passive (receive only) users who may be located remotely around the world. The apparatus typically located at such a passive user site is designated at 18. Benefits to such remote users include navigation, calibration and synchronization of their local time and frequency references and special one-way information transfer.

As illustrated in FIG. 2, aboard the typical navigation satellite, the proposed phase shift synthesizer of the subject invention accepts a source signal at 11 from a crystal oscillator 11*a* and provides an adjusted output signal at 13 to the satellite's time and frequency subsystem 19 wherein specific time and frequency references are coherently developed. The frequency references become the carrier signals and the time references comprise the modulation at the modulator and radio transmitter(s) designated at 20. The associated transmitting antenna is omnidirectional within the subtended earth angle to serve all users within that area.

At the supporting ground station, when the navigation satellite is within the radio horizon, the signals received, at 21, from the satellite are tracked and measurements are made against a local approved system (or primary) reference standard of time and frequency, designated at 22. At the illustrated computing center 23, computations (allowing for slant range and determinable delays and biases) would then be made to obtain a calibration of the errors at the satellite, specifically the error in frequency of the adjusted output signal at 13 from the proposed incremental phase shifter type synthesizer and the error in timing epochs both in position and rate relative to universal time (UT), atomic time (AT), or some other approved system time reference. Although the crystal oscillator 11*a* shown in the satellite application of FIG. 2 is a typical source of input frequency, it is to be understood that the scope of the invention is not limited to this particular form of input frequency signal source.

When it is determined by the ground support station of FIG. 2 or by some other external equipment not a part of this invention that the adjusted output signal at terminal 13 is incorrect; i.e., there are time and/or frequency errors relative to system standards, appropriate digital command instructions, after proper formatting at 24, are communicated over command radio link 25–26 to the satellite where the instructions are stored on a suitable memory register 27. This memory register 27 thereafter supplies the control or command information to the input terminal 12 and to the illustrated divider control and interfaces unit 17 in order to select unique frequency division ratios within the selectable frequency divider 15. As will be described in more detail hereinafter, the output of the selectable frequency divider 15 is applied to and selects the rate of scanning of the incremental phase controller 14; i.e., the rate at which the phase of the input signal at 11 is advanced or retarded is changed by increasing or decreasing the frequency output from divider 15. More specifically, the frequency of the divider 15 output signal is set by the action of the digital control data 12 in selection of a numerically unique divisor for the frequency divider 15 in such a manner that increasing the divisor ratio decreases the scanning frequency to the phase controller 14; whereas, decreasing the divisor increases the scanning frequency.

The output 12 of memory register 27 is thus generally in the form of a program of digital instructions which adjust and select specific numerical division values for the selectable frequency divider 15. The program of digital instructions is dependent upon three factors: namely, (a) the accuracy to which future performance of the source oscillator 11*a*can be predicted as a function of time, (b) the frequency of availability of the system for calibration and adjustment to a primary standard reference, and (c) the size or capacity of the memory register 27.

Figure 3:
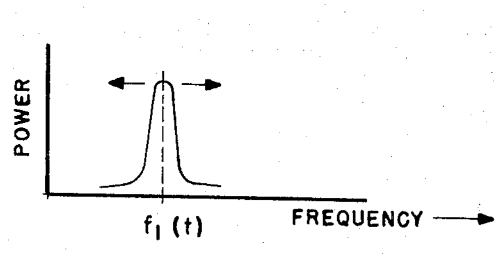
FIGS. 3, 4 and 5 are graphic plots of power spectra useful in describing the operation of the present invention.
Figure 5:
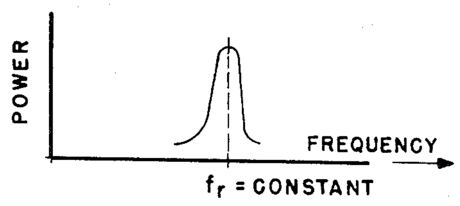

The general function of the proposed incremental phase shift frequency synthesizer is to accept the source signal 11 which is illustrated in the frequency domain at a frequency $f_i$ in FIG. 3 and which may drift according to some predictable function of time, and to synthesize a correct frequency reference signal at a constant specified value $f_r$ as illustrated in the frequency domain by FIG. 5. This is accomplished by applying sequentially staircase phase adjustments, in the form illustrated in the time domain by FIG. 6, to the source or oscillator signal 12, thereby resulting in an over-all change in frequency as determined by the slope of the staircase signal of FIG. 6. More specifically, the greater the increase in value of $d\theta/dt$ ; i.e., the slope of the staircase, the greater will be the change in frequency produced by the phase compensation or adjustment. A more detailed discussion of the operation of the incremental phase controller will follow hereinafter.

Figure 4:
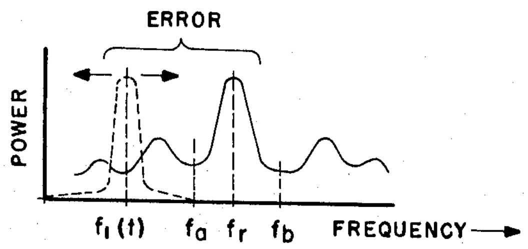

The output of incremental phase controller 14 is shown in FIG. 4, again in a frequency domain illustrated, and contains undesired modulation sidebands. Therefore, the output of the incremental phase controller 14 is applied to a selective transmission filter 16 which attenuates the undesired modulation and also any remaining component of the source signal 11 that feeds through. One possible embodiment of the selective transmission filter 16 is a band-pass filter having a center frequency at $f_r$ and lower and upper cutoffs at $f_a$ and $f_b$ respectively, as shown in FIG. 4. As a result, the harmonic sidebands are eliminated and the adjusted output signal appearing at 13 has a center frequency of $f_r$, corresponding to the correct time/frequency standard. If necessary, a distribution amplifier of any suitable design (not shown) can be connected at the output of filter 16 to provide impedance matching between the filter 16 and the time and frequency system 19. In one hardward implementation of the present invention developed for the satellite application of FIG. 2 which is typical, the selective transmission filter 16 is a commercial unit of the crystal band-pass type having specifications as follows:

center frequency — 4,999,577.6 Hz
3 dB bandwidth — ± 100 Hz
10 dB bandwidth — ± 200 Hz
15 dB bandwidth — ± 300 Hz
ultimate attenuation — 40 dB
insertion loss — 3.7 dB
impedance In/Out — 50 Ohms.

Figure 8:
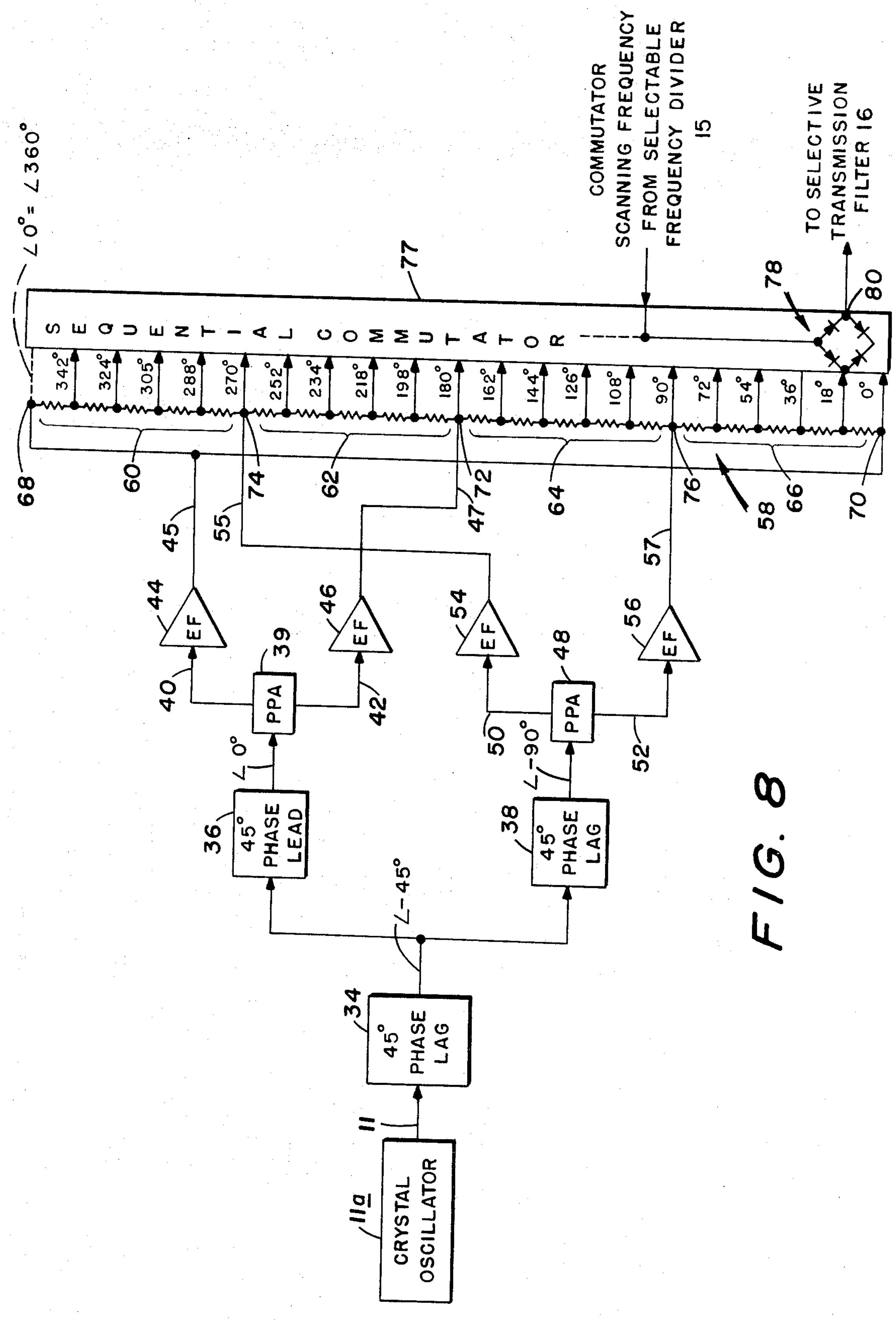
FIG. 8 is a block diagram, partially schematic, showing one embodiment of the phase controller that is utilized in the subject invention.
Figure 9:
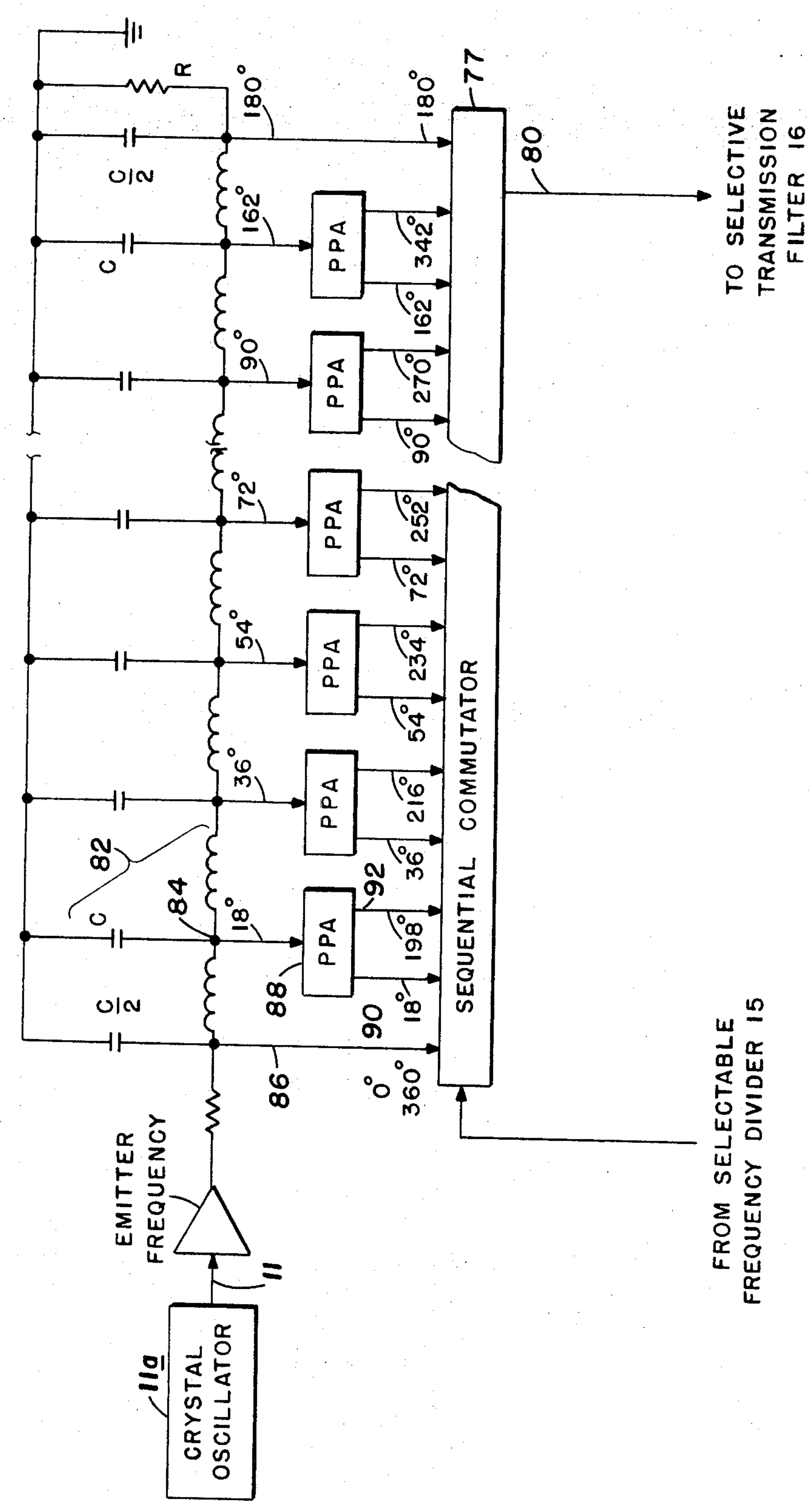
FIG. 9 is a block diagram, partially schematic, showing another embodiment of the phase controller.

There are several configurarations that may be used to achieve a reliable solid state mechanization of the incremental phase controller 14. Examples are shown in FIGS. 8 and 9. The incremental phase controller 14 has $n$ phase steps or increments which range from 0°, 360°/$n$, . . . [(n − 1) 360°]/$n$. The dwell time ($\Delta t$) at each increment or phase step and the average slope of the incremented phase compensated signal, $d\phi/dt$, is determined by the selectable frequency divider 15. As the magnitude of the slope $d\phi/dt$ is increased, the change in the average frequency at terminal 13 of FIG. 1 will be increased, i.e., the greater will be the difference between frequencies $f_1$ and $f_r$ (see FIG. 4).

Figure 6:
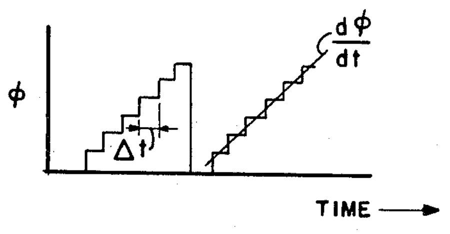
FIG. 6 is a graphic plot illustrating the incremental scanning of the phase controller utilized in the present invention.

Referring now to FIG. 8, there is shown a four quandrant phase controller for producing the phase staircase function illustrated in FIG. 6. Output 11 of crystal oscillator 11$a$ is applied, for mathematical convenience only, to a 45° phase lag circuit 34 whereby output (which previously had a phase angle of 0°) has, emergent from phase lag circuit 34, a phase angle of − 45°.

The signal emergent from phase lag circuit 34 is applied in parallel to a 45° phase lead circuit 36 and to a second 45° phase lag circuit 38. Emergent from 45° phase lead circuit 36 is the crystal oscillator output at 0° phase angle. This signal is, in turn, applied to a paraphase amplifier 39 which produces a first output having 0° phase angle and a second output 42 having 180° phase angle. Outputs 40 and 42 are applied to emitter followers 44 and 46. Emergent from 45° phase lag circuit 38 is the crystal oscillator output at − 90° phase angle. This signal is, in turn, applied to a second paraphase amplifier 48 which produces a first output 50 having 270° phase angle and a second output 52 having 90° phase angle. Outputs 50 and 52 are applied to emitter followers 54 and 56. The purpose of applying outputs 40, 42, 50, and 52 to emitter followers 44, 46, 54, and 56 respectively is to provide the necessary impedance matching with the four quandrant incremental potentiometer shown generally at 58. Four quandrant incremental potentiometer 58 is composed of four resistive quandrants 60, 62, 64 and 66, each bank capable of producing a 90° phase delay between its upper and lower nodes. Output 45 of emitter follower 44 is applied in parallel to upper node 68 of quandrant 60 and also to lower node 70 of quandrant 66. Output 47 of emitter follower 46 is applied to node 72 which is the lower node for quandrant 62 and the upper node for quadrant 64. Output 55 of emitter follower 54 is applied to node 74 which is the lower node for quadrant 60 and the upper node for quandrant 62. Output 57 of emitter follower 56 is applied to node 76 which is the lower node of quadrant 64 and upper node of quadrant 66. Therefore, quadrant 66 is capable of producing phase angles varying from 0° at node 70 to 90° at node 76. Quadrant 64 is capable of producing phase angles varying from 90° at node 76 to 180° at node 72. Quadrant 62 is capable of producing phase angles varying from 180° at node 180° to 270° at node 74. Quadrant 60 is capable of producing phase angles varying from 270° at node 74 to 360° or 0° at node 68.

Attached to each phase angle produced by each quadrant of the potentiometer 58 is a sequential commutator 77, which starts at the 0° phase angle of node 70 and steps through all the phase angles until the 342° phase angle is reached at which time the sequential commutator resets and begins a new sweep at node 70. In this manner the staircase phase signal of FIG. 6 is produced. One specific embodiment that may be utilized as the sequential commutator 77 is a multiplicity of diode bridges, one of which is shown typically at 78. The output signal from selectable frequency divider 15 provides the bias necessary to form a low impedance path from the specific phase terminal of a certain node to the output terminal 80. When the bias is removed from a diode bridge 78, it is correspondingly applied to the diode bridge switch at the next adjacent node. Other implementations of a four quadrant phase controller are of course possible without departing from the general concepts of the present invention.

Referring now to FIG. 9, there is shown a delay line type phase controller which serves as another embodiment of the illustrated incremental phase controller 14 in FIGS. 1 and 2. The delay line phase controller of FIG. 9 functions generally on the same basic principles as the four quadrant phase controller of FIG. 8, however, there are important differences in detail. Basically, the delay line phase controller converts the output of the crystal oscillator 11a into a multiplicity of precisely delayed signals which if compared to oscillator output 11 exhibit the equivalent of phase angles that vary from 0° to 360° in increments which are, in turn, scanned by a solid state, sequential commutator. The basic difference between the delay line phase controller of FIG. 9 and the four quadrant phase controller of FIG. 8 is in the apparatus employed to obtain the twenty phase angles. Whereas the four quadrant phase controller employs two paraphase amplifiers 39 and 48, followed by a four quadrant potentiometer 58, the delay line phase controller utilizes a plurality of resonant circuits, designated typically at 82, the output of each resonant circuit being applied to a paraphase amplifier (except for the circuits that produce the 0°/360° phase signals). For example, consider the circuit shown at 82 in FIG. 9. At node 84 is produced a signal having a phase angle of 18° (relative to the input signal at node 86) which is, in turn, applied to paraphase amplifier 88. As before, the paraphase amplifier 88 produces a first signal whose phase is identical to the phase of the input signal and a second signal whose phase angle is advanced 180° from the phase angle of said first signal. Therefore, paraphase amplifier 88 produces a first signal of 18° phase angle shown at 90, and a second signal of 198° shown at 92. The sequential commutator 77 therefore scans said first output signals of each paraphase amplifier, thus obtaining signals whose phase angles vary from 18° to 180°. It should be noted that the sequential commutator 77 will scan the 0° to 180° signals in sequence. Then it drops back to paraphase amplifier 88 and scans said second grouping of output signals, thus obtaining signals whose phase angles vary from 198° to 342° so that the total phase function of time is a uniform staircase of 20 steps from 0° to 342° conforming to the general pattern of FIG. 6. In one practical application of the present invention employing a delay line type phase controller, the controller employed the equivalent of 200 steps of 1.8 degrees or 1 nanosecond each, for generation at 5mHz.

Figure 7:
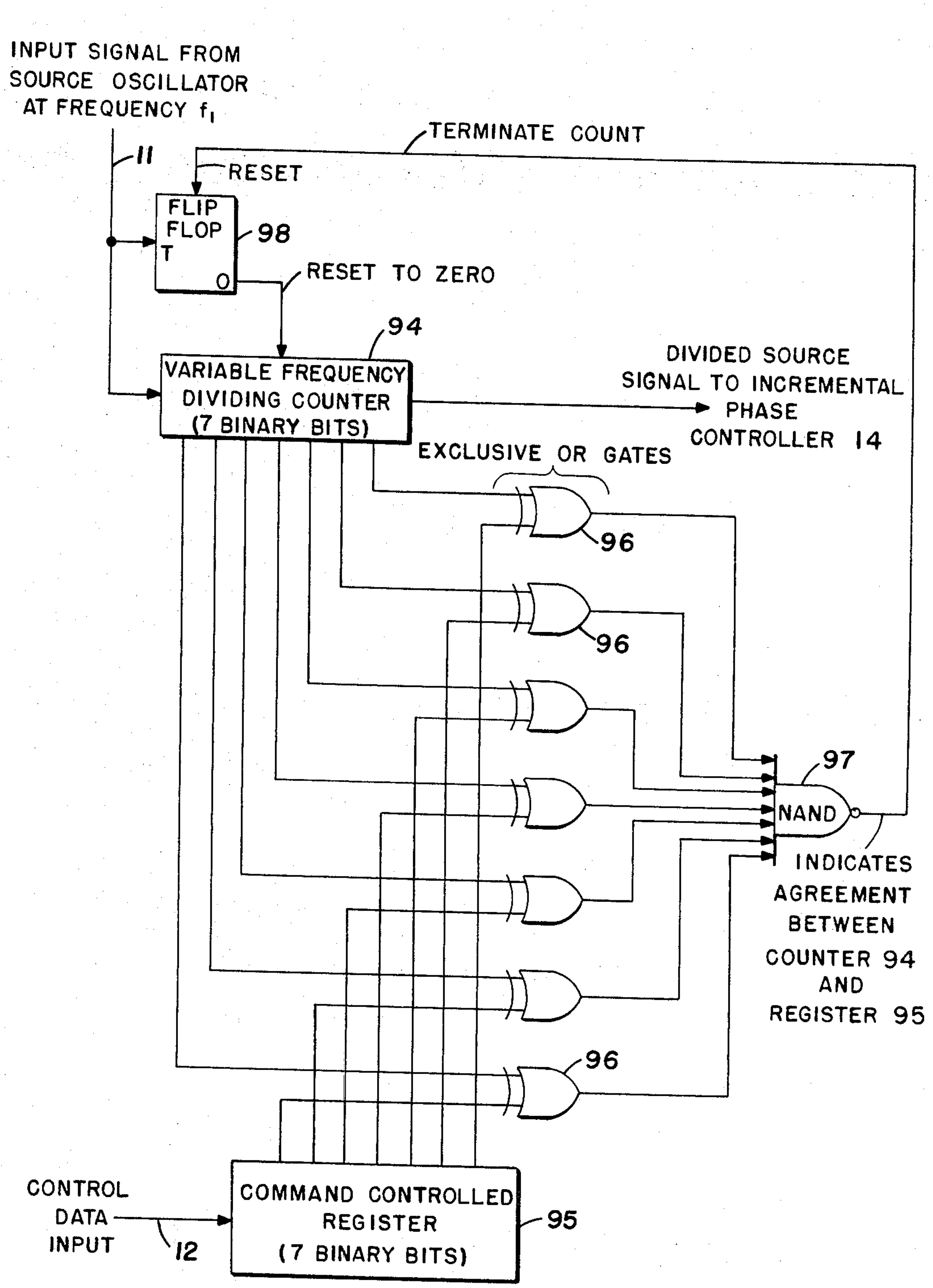
FIG. 7 is a block diagram of one embodiment of the selectable frequency divider utilized in the present invention with the associated divider controls and interfaces.

The selectable frequency divider 15 and the associated divider control/and interface unit 17 shown in FIG. 1 are digital logic circuits, one embodiment of which is illustrated in FIG. 7 of the drawings. More specifically, in this illustrated embodiment, the selectable frequency divider is basically a binary counter 94 of seven binary bit capacity. The input to the divider 94 is the source oscillator output signal 11 which is therein divided by any number from 2 to 127; i.e., from $2^1$ to $2^7 - 1$. The variability of the divisor is derived from a command controlled register 95 which may be remotely controlled or not, as desired, and into which a preselected binary number is set; e.g., from the memory register 27 in FIG. 2. This number is the desired number by which the selectable frequency divider will divide the input oscillator signal at 11. Thus, corresponding bit positions in the counter 94 and register 95 are connected to exclusive OR comparison gates 96 which continuously look for agreement between the binary number stored in register 95 and the continuously increasing count of counter 94. When agreement is found, a control signal from NAND gate 97, at the output of the comparison gates 96, terminates the counting operation at counter 94, via control flip-flop 98, and resets the counter 94 to zero. The command controlled register 95 remains static with the selected number until such time that it is desired to change the divider number; i.e., the count at which counter 94 resets. On the other hand, the divider 15 (counter 94 in FIG. 7) operates continuously and the divided output is thus available to the phase controller 14 as long as the divider input frequency $f_1$ is present.

The divided output frequency of the counter 94 is thus a function of the equation:

$f_{out} = f_1/N$

Where $f_{out}$ is the divider 94 output frequency, $f_1$ is the source oscillator frequency at 11, and N is the preselected number commanded into the register 95. As discussed hereinabove, the output of the divider counter 94 is connected to the phase controller circuits (see FIGS. 8 and 9) to control the speed or rate of the phase steps. The dwell time at each phase step and therefore the average slope $d\phi/dt$ of the phase time function shown in FIG. 6 is thus controlled by the programmed selection of values for N.

In view of the above description it will be seen that the present invention provides apparatus for the compensation of time and frequency standards for various applications. The proposed sequentially scanned incremental phase adjustement method can thus provide bias offset in frequency and can moreover be programmed to compensate for the drift of the time and frequency standard over a predictable interval. In the adjustment of the epochs of a timing system or clock derived from the adjusted signal (at output 13 in FIG. 1) provided by the incremental phase shift synthesizer, an epoch can be advanced in real time by temporarily operating the system at a higher frequency than specified and then returning to the normal value. Similarily an epoch can be retarded by temporarily operating at a lower frequency and then returning to normal.

Obviously many modifications and variations of the present invention are possible in light of the above teachings. It is therefore to be understood that within the scope of the appended claims, the invention may be practiced otherwise than as specifically described.

What is claimed is:

1. Apparatus for producing from an input signal of frequency $f_1$ a normalized output signal at a specified reference frequency $f_r$ comprising, a signal of preselected frequency, frequency divider means connected to receive said signal of preselected frequency, control means responsive to control data operably connected to control said frequency divider means to divide down said preselected frequency to produce a lower frequency signal, incremental phase shift means connected to receive said input signal at frequency $f_1$ and responsive to lower frequency signal from said frequency divider means for imparting incremental phase shifts to said input signal at a rate determined by said lower frequency signal to produce an incrementally phase shifted signal at the specified reference frequency $f_r$, and band-pass filter means having a pass band centered at said specified reference frequency $f_r$ operably connected to said incremental phase shift means for filtering said incrementally phase shifted signal, said frequency divider means including, a command controlled register means having multiple bit storage positions for stroing in binary bit form a digital count selected by said control data representing the desired frequency value of said lower frequency signal, a variable frequency dividing counter means operably connecting said signal of preselected frequency to said incremental phase shift means and having multiple bit counting positions equal in number to the multiple bit storage positions of said command controlled register means, means operably connected to said variable frequency dividing counter means and said command controlled register means for performing a bit-by-bit comparison of the bit positions of said counter means and said registering means, and means responsive to said comparison means for repetitively resetting said counter means to a zero count condition each time correspondence is detected by said comparison means between all corresponding bit positions in said counter means and said registering means.

2. The apparatus specified in claim 1 wherein said signal of preselected frequency is said input signal.

3. The apparatus specified in claim 1 wherein said incremental phase shift means includes, a plurality of phase shift means each capable of imparting a predetermined different amount of phase shift to said input signal, and commutating control means operably connected to receive said lower frequency signal for sequentially interconnecting selectively said plurality of phase shift means between said input signal and said filter means at a rate determined by said lower frequency signal, whereby said reference frequency depends on the frequency of said lower frequency signal.

4. The apparatus specified in claim 1 wherein said incremental phase shift means comprises circuit means for producing a plurality of signals each being incrementally displaced in phase relative to said input signal by progressively increasing amounts which range from $0°, 360°/n, \ldots (n-1)/n\ 360°$, where $n$ is the desired number of phase steps or increments into which said input signal is to be incremented.

5. The apparatus specified in claim 4 wherein said circuit means includes, means connected to receive said input signal for producing output signals representing respectively said input signal displaced by 0°, 90°, 180°and 270°, and a four quadrant potentiometer means each quadrant of which is connected between quadrature displaced pairs of said 0°, 90°, 180° and 270° displaced signals and including resistive means effictive to subdivide each quadrant of said potentiometer into n nodes at which appears the plurality of signals incrementally displaced in phase relatively to said input signal within the range $0°, 360°/n, \ldots (n-1)/n\ 360°$.

6. The apparatus specified in claim 4 wherein said circuit means for producing said plurality of phase displaced signals includes a multiple tapped delay line connected to receive said input signal and capable of producing at its multiple taps said plurality of signals increasing displaced in phase relative to said input signal.

7. The apparatus specified in claim 4 further including means for sequentially commutating the plurality of signals produced by said incremental phase shift means to said filter means.

8. The apparatus specified in claim 7 wherein said sequential commutator means operates at a rate determined by said lower frequency, whereby the cumulative phase shift imparted to said input signal by said incremental phase shift means is dependent upon said lower frequency.

* * * * *